(12) United States Patent
Brannon et al.

(10) Patent No.: US 7,676,835 B2
(45) Date of Patent: Mar. 9, 2010

(54) SYSTEM AND METHOD FOR REGULATING ACCESS TO OBJECTS IN A CONTENT REPOSITORY

(75) Inventors: Karen W. Brannon, Palo Alto, CA (US); Hui-I Hsiao, Saratoga, CA (US); Huong T. Morris, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1162 days.

(21) Appl. No.: 10/931,515

(22) Filed: Aug. 31, 2004

(65) Prior Publication Data

US 2006/0080546 A1 Apr. 13, 2006

(51) Int. Cl.
G06F 7/04 (2006.01)
G06F 15/16 (2006.01)
G06F 17/30 (2006.01)
H04L 29/06 (2006.01)

(52) U.S. Cl. ............................................. 726/10; 726/7
(58) Field of Classification Search .................... 726/7, 726/10
See application file for complete search history.

(56) References Cited

U.S. PATENT DOCUMENTS

| | | | |
|---|---|---|---|
| 5,649,185 A | 7/1997 | Antognini et al. | |
| 5,673,316 A | 9/1997 | Auerbach et al. | |
| 5,974,451 A * | 10/1999 | Simmons | 709/218 |
| 5,991,810 A * | 11/1999 | Shapiro et al. | 709/229 |
| 6,021,410 A | 2/2000 | Choy | |
| 6,029,160 A | 2/2000 | Cabrera et al. | |
| 6,044,373 A | 3/2000 | Gladney et al. | |
| 6,044,378 A | 3/2000 | Gladney | |
| 6,076,077 A | 6/2000 | Saito | |
| 6,330,605 B1 | 12/2001 | Christensen et al. | |
| 6,610,304 B1 | 8/2003 | de Rouge | |
| 6,718,328 B1 * | 4/2004 | Norris | 707/9 |
| 7,200,681 B1 * | 4/2007 | Lewin et al. | 709/246 |
| 7,363,361 B2 * | 4/2008 | Tewari et al. | 709/223 |
| 2001/0020228 A1 | 9/2001 | Cantu et al. | |

OTHER PUBLICATIONS

Challenger, Jim et al. "A Scalable System for Consistently Caching Dynamic Web Data", 1999 IEEE.*
Kurose, James F. et al. Computer Networking, A Top-Down Approach Featuring the Internet, 2003 Pearson Education, Inc., pp. 155-165.*

(Continued)

*Primary Examiner*—Michael J Simitoski
(74) *Attorney, Agent, or Firm*—Oppenheimer Wolff & Donnelly LLP (57) ABSTRACT

A content management system integrated with a web caching proxy that delivers content according to access control rules. An access control token is generated using a secret key when a user selects a desired object (to be provided only upon token validation, thus the object retrieval and delivery task can be delegated). However, tokens for other content and/or for other users could be generated by a rogue resource manager. If the desired object is already cached, the proxy asks the resource manager to validate the token and then selectively provides the desired object without contacting a library server. Alternately, the proxy itself performs the token validation, but must coordinate with the library server to ensure it has the latest secret key. Finally, the tokens may contain digital signatures generated with a private key and validated with a corresponding public key, so that private keys need not be distributed.

23 Claims, 4 Drawing Sheets

OTHER PUBLICATIONS

Hsiao, Hui-I et al. "Secure Information Caching on the Web", Apr. 14-17, 2004.*

Giles, James et al. "Authentication for Distributed Web Caches", ESORICS 2002, LNCS 2502, pp. 126-146, Springer-Verlag 2002.*

Dilley, John et al. "Globally Distributed Content Delivery", 2002 IEEE.*

[BBHMNS02] S. Bhattacharya, K. Brannon, H. Hsiao, C. Mohan, I. Narang, M. Subramanian, Coordinating Backup/Recovery and Data Consistency Between Database and File Systems, Proc. ACM SIGMOD Conf., Madison, WI, Jun. 2002.

[CDNSW96] A. Chankhunthod, P. B. Danzig, C. Neerdaels, M.F. Schwartz, and K. J. Worrell. A Hierarchical Internet Object Cache. 1996 USENIX Technical Conf. San Diego, CA, Jan. 1996.

[Danzig98] NetCache Architecture and Deployment, Proc Third International WWW Caching Workshop, Manchester, England, Jun. 1998.

[Davison] Proxy Caches, http://www.webcaching.com/proxy caches.html.

[Doc] Documentum Content Management System, http://www.documentum.com.

[DSA] Digital Signature Standard, NIST FIPS Pub 186, (1994), http://www.itl.nist.gov/fipspubs/fip186.htm.

[FileN] FileNet Content Manager, http://www.filenet.com.

[Her03] M. Herbach, Manage your digital content effectively, IBM DB2 Whitepaper G325 2143 00, Mar. 2003.

[ITS] Inktomi Traffic Server, http://www.inktomi.com/products/cns/.

[LNB L] CERN httpd, http://www.w3.org/Daemon/Status.html.

[Jigsaw] Jigsaw, W3C Java Web Server, http://www.w3.org/Jigsaw.

[RFC1738] RFC 1738, Uniform Resource Locators, http://www.w3.org/Addressing/rfc1738.txt, (1994).

[RSA] R.L. Rivest, A. Shamir and L.M. Adelman, A Method for Obtaining Digital Signatures and Public Key Cryptosystems, Comm of the ACM, V21, p. 120 126, (1978).

[Sch] B. Schneier, Applied Cryptography 2nd Ed., John Wiley and Sons, New York, 1996.

[SWPC] Squid Web Proxy Cache, http://www.squid cache.org.

[WSES] IBM WebSphere Edge Server, http://www.ibm.com/software/webservers/edgeserver.

[WSESPG] WebSphere Edge Server Programming Guide V2.0, GC09 4568 02, http://www.ibm.com/software/webservers/edgeserver/library.html.

[WSESV2] IBM WebSphere Edge Server New Features and Functions in Version 2, SG24 6511 00, http://www.ibm.com/redbooks.

Arthur Cantu, Henry Martin Gladney, Umethod, system and program for managing relationships among entities to exchange encryption keys for use in providing access and authorization to resources, Application No. US2001000814624 filed Mar. 22, 2000.

* cited by examiner

SYSTEM AND METHOD FOR REGULATING ACCESS TO OBJECTS IN A CONTENT REPOSITORY

FIELD OF THE INVENTION

This invention relates to regulating access to objects in a content repository. Specifically, a content management system is integrated with a web caching proxy that enforces access control rules and delivers content to users.

BACKGROUND OF THE INVENTION

Content management systems are used to administer business information, including text, image, video and web content. Such systems typically provide strict access control for managed content. Users and groups can be defined with rights to create, retrieve, update, and delete content, for example. Examples of commercial enterprise content management products include IBM DB2 Content Manager (referred to hereafter simply as Content Manager), Documentum [Doc] and FileNet Content Manager [FileN]. Content Manager is an enterprise content management system which provides an infrastructure for business information management [Her03]. Content repository services include capture, creation, organization, workflow, archival and lifecycle management.

Delivery of such content to users could be enhanced by using a proxy cache to minimize network bandwidth and improve the quality of service for users. The same cached content can be delivered to multiple users or to a given user multiple times by the proxy without the need to contact a back end server. Proxy caches are typically deployed as forward proxy servers, reverse proxy servers or transparent proxy servers; thus cached content can be placed in the network closer to the users or in front of back-end content servers in order to reduce the load on these servers. There are numerous public domain and commercial web caching proxies available today including Cern-httpd [LNB-L], Squid [SWPC], Harvest [CDNSW96], Jigsaw [Jigsaw], IBM WebSphere Edge Server [WSES], Inktomi Traffic Server [ITS] and NetCache [Danzig98]. A listing of web proxy caches can be found in [Davison].

However, the proxy cache needs to be aware of and enforce any access control rules defined in the content management system for content that originates in the content management system but is cached by the proxy server. For example, assume a company serves three tiers of clients: platinum, gold, and silver. The content management system might store content which should only be visible to the platinum customers. If such content is cached, the proxy server must ensure that this content can not be retrieved by a silver customer.

A content management system that is integrated with a web caching proxy so that content under the control of the content management system is delivered to users from the proxy cache according to specified access control rules is therefore needed.

SUMMARY OF THE INVENTION

It is accordingly an object of this invention to provide a system, method, and computer program product for regulating access to objects in a content repository. A content management system is integrated with a web caching proxy so that content under the control of the content management system is delivered to users from the proxy cache to leverage the usual advantages offered by caching. At the same time, the proxy enforces the access control rules set in the content management system for the content being cached. Thus, fine-grained access control is preserved for cached content.

A user application queries a library server that has a secret key, indexes data, and stores data access control rules. The library server responsively returns a list of URLs satisfying the query. The user application then presents the list to the user. When a user selects a URL corresponding to a desired object, the library server can provide the object to the user or can generate an access control token using its secret key in order to offload the object retrieval and delivery task. In this latter case, a resource manager that stores objects receives the URL and the token, and attempts to validate the token. The selected object is to be provided to the user only if the validation succeeds. However, the library server may not trust the resource manager to behave properly, e.g. a rogue resource manager may generate tokens for other content and/or for other users and therefore must not have the required secret key.

In a first embodiment, if the desired object is already cached by a proxy, the proxy asks the resource manager to validate the token. If the validation succeeds, then the proxy provides the desired object. Thus, the proxy can deliver the same content to multiple users or deliver particular content to a given user multiple times without contacting a library server.

In a second embodiment similar to the first embodiment, the proxy itself performs the token validation, but must stay synchronized with the library server to be assured it has the latest secret key.

In a third embodiment similar to the second embodiment, the tokens contain digital signatures that are generated with the private key and validated with a corresponding public key, so that private keys need not be distributed at all.

Tokens may expire after a predetermined time and may include a message authentication code having a one-way hash and a secret key. The hash may be a function of the secret key, a token expiration time, an object ID, a version number, and flags indicating the type of access allowed. The hash may be encrypted with the secret key.

The invention may be employed as a business service that enables enhanced content management and distribution in electronic commerce.

The foregoing objects are believed to be satisfied by the embodiments of the present invention as described below.

DETAILED DESCRIPTION OF THE INVENTION

Figure 1:
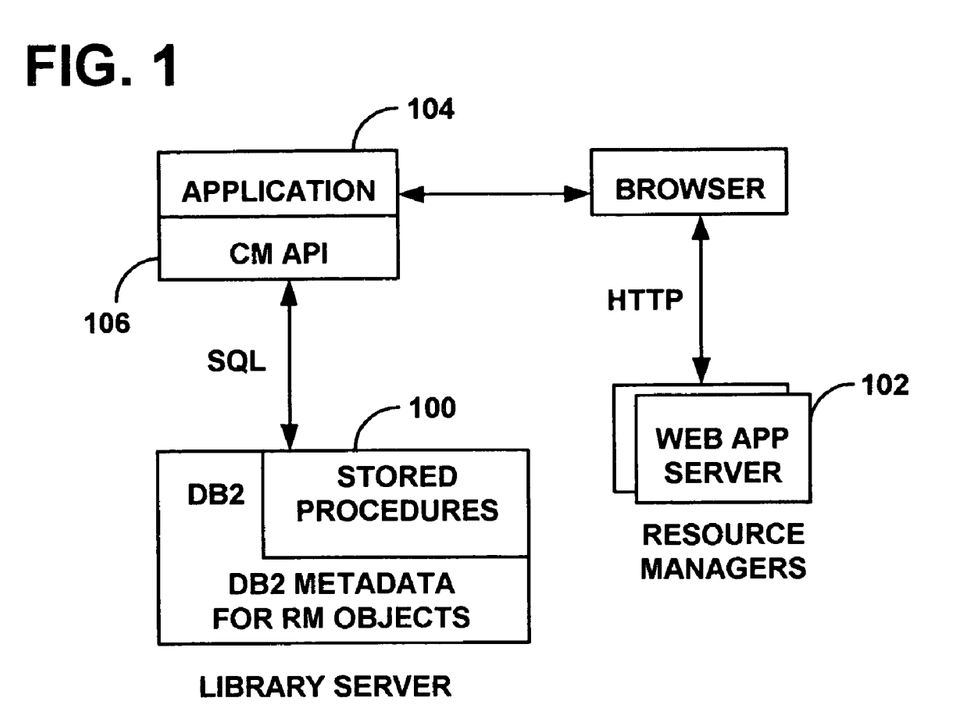
FIG. 1 is a diagram of Content Manager architecture.

Referring now to FIG. 1, the architecture of Content Manager (CM) is shown. Content Manager uses a multi-tier distributed architecture with full transactional capabilities. Two main components of Content Manager are the Library Server (LS) and the Resource Manager (RM). There can be multiple Resource Managers associated with one Library Server in a Content Manager system.

The Library Server is preferably a DB2 database with a set of stored procedures for carrying out the functions of indexing data, controlling access to data, locating data, and managing transactions. The Resource Managers are designed for optimal storage, retrieval and archival of objects stored in the Content Manager system. In the scenario of interest here, objects such as text, image, video files are stored on the Resource Managers, while metadata about these objects is preferably stored on the Library Server. Resource Manager objects are uniquely identified in a Content Manager system via Object IDs and Version Numbers (VerNo). The Resource Manager handles the mapping of an Object ID and a Version Number to the location of a physical file, for example.

The Library Server searches the metadata to locate Resource Manager objects of interest. For example, a query in an insurance setting might ask to locate all photographs associated with a given insurance claim number. The photographs would be stored on a Resource Manager, while the metadata including claim number would be stored on the Library Server. Each Resource Manager is a web application server, so applications preferably communicate with the Resource Managers via HTTP to allow web-enabled retrieval and storage of content. FIG. 1 also shows the client application layer. Content Manager APIs are available for Java and C++.

Fine-grained access control rules are available in the Content Manager system to manage access to the metadata as well as the objects. Available access types include: create, retrieve, update, delete, and stream (e.g. video streaming). A user may be allowed to retrieve an object but not update that object. This invention focuses only on retrieval. Create, update and delete are not considered.

In the Content Manager distributed architecture, the Library Server manages users and groups (optionally via LDAP) and access privileges for Content Manager objects. The Library Server supports fine-grained access control on all objects, item types, and workflow entities in a Content Manager system, whether stored either in the Library Server database or in the Resource Managers. Since access to Resource Manager objects is managed by the Library Server, an application is relieved from the responsibility of managing cookies, or HTTP authentication.

User/group information and the access control rules are managed only on the Library Server, and not on the Resource Managers. Resource Managers must be informed that access should be allowed to a stored object. Content Manager uses access control tokens to accomplish this task. An access token for an object is generated by the Library Server and is then validated when presented to a Resource Manager. Such a token can for example be included in a URL used to access a Resource Manager object via HTTP. The access token indicates to the Resource Manager that the holder of the token has obtained permission from the Library Server to access a corresponding on the Resource Manager. Access tokens preferably expire after a predetermined length of time, which is a configurable parameter set on the Library Server.

For an access control token to be contained in a URL, it must be comprised of RFC 1738 compliant characters [RFC1738]. The primary component of the token is a message authentication code (MAC), which is a one-way hash value with the addition of a secret key [Sch]. Verifying the resulting hash value requires knowledge of the secret key. The MAC, m is computed for a given Resource Manager object as follows:

$$m = hash(K, Tx, ObjID, VerNo, AccType, flags),$$

where hash is the one-way hash function, K is a secret symmetric key, Tx is the token expiration time, ObjiD and VerNo are object ID and version numbers respectively that uniquely identify the Resource Manager object, AccType is the access type to be allowed, and flags contain other information about the token.

An alternate MAC, m' could be produced by encrypting a one-way hash value, h' using the secret key as follows:

$$h' = hash(ObjID, VerNo, AccType, flags),$$

$$m' = E_K(h'),$$

where $E_K$ denotes a symmetric encryption algorithm.

Tx, AccType and flags are also passed inside the token. The Library Server generates the access token containing m (or m') and then passes the access token back to the client as part of the result of a query to the Library Server. When the URL containing the access token is presented to the Resource Manager, the Resource Manager then validates the access token. Both the Library Server and the Resource Managers need to have knowledge of the secret key since computation of the MAC is involved in both the generation and validation of the access control token.

The Resource Manager begins the token validation process by first checking that the current time is less than Tx, the token expiration time. Next, the Resource Manager checks that the access type requested is consistent with the access type permitted by the token. For example, a user granted retrieve permission would also be allowed to stream a video. The reverse would not be allowed however; streaming permission does not include retrieval permission. Lastly, the Resource Manager validates the MAC contained in the token. If the MAC was computed as m above, the Resource Manager would generate a MAC, M:

$$M = hash(K, Tx, ObjID, VerNo, AccType, flags).$$

The Resource Manager compares M and the m contained within the token. If M and m are equal, then access to the object is allowed. Note that if the token has been tampered with, it will be almost impossible for M and m to be equal, since they are one-way hashes.

If the token contains the MAC m', then the Resource Manager would generate the one-way hash, H' as follows:

$$H' = hash(ObjID, VerNo, AccType, flags)$$

and then recover the one-way hash value, h' computed at the Library Server by decrypting the MAC m', $$h' = D_K(m').$$

If H' and h' are identical then the token is valid.

The access control token scheme used in Content Manager is also employed by the DataLinks feature of DB2 and is described in [BBHMNS02]. In DataLinks, objects are stored in a native file system, but managed by DB2. Access to objects is via normal file system calls such as open, read, write, etc.

Figure 2:
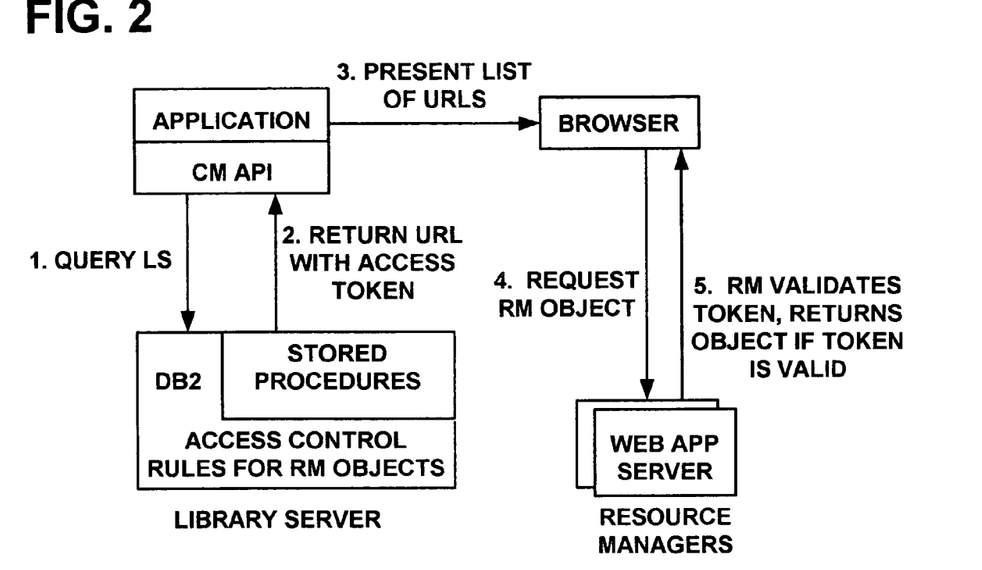
FIG. 2 is a diagram of the access control flow in Content Manager for objects stored on a Resource Manager, according to an embodiment of the present invention.

Referring now to FIG. 2, the access control flow in Content Manager for objects stored on a Resource Manager is shown. In the first step, the application makes a query to the Library Server to locate objects stored on a Resource Manager. Next, in step 2, the Library Server returns a list of URLs for the objects which satisfy the query. Such a URL contains for example, the ObjectID, VersionNo, and the access token. The application then presents a list of choices to the user in step 3. In step 4, the user selects an object and sends the URL describing the object to the Resource Manager. The Resource Manager validates the access token in step 5, and if the token is valid, returns the object to the user.

Both the Library Server and Resource Managers require knowledge of the secret key, K. There currently is a secure process in place for the distribution of the secret key(s) stored on the Library Server to the Resource Managers. This communication path between the Library Server and the Resource Managers is also required for data other than the secret keys.

If Resource Manager content is cached on the web at a proxy, the cache could deliver content to an unauthorized user or could deliver content at time which is later than the token expiration time. To take advantage of the benefits of caching without compromising the Content Manager access control structure, integration of Content Manager and the proxy cache is required. In addition, a Content Manager system with multiple Resource Managers could make use of caching by allowing content persistently stored at one Resource Manager to be cached by another Resource Manager.

A prototype of such an integrated system has been constructed, based on Content Manager and the proxy cache component of IBM WebSphere Edge Server V2, referred to hereafter as WSES [WSESV2]. The proxy cache in the prototype enforces the access control rules of the content management system for cached content originating from the content management system.

IBM Websphere Edge Server is web infrastructure software which can be used to address scalability, reliability and performance needs of applications in both local and geographically distributed environments. WSES has four components: Network Dispatcher, Content Distribution Component, Edge Server Application Offload Service, and the Caching Proxy. Network Dispatcher is used for load balancing. The Content Distribution Component provides a framework for distributing static and dynamic content to the edge. The Application Offload component allows a J2EE compliant application to run at the edge server.

The Caching Proxy component of IBM WebSphere Edge Server is employed by the prototype implementation of the present invention. This proxy can be configured to operate as a forward (or transparent) proxy server for clients, or as a reverse proxy server for other servers. The proxy also supports a plug-in architecture which allows extensions for customized processing. The API to the WebSphere Edge Server Caching Proxy is described in [WSESPG]. A plug-in modifies the default server authorization operation when calling the proxy to enforce Content Manager access control on Resource Manager objects served from the proxy cache.

Integration of the Content Management System and Edge Server Proxy Cache

Three different approaches are described that enable caching of Content Manager content at the proxy cache while enforcing the Content Manager access control rules. These approaches are described as different preferred embodiments of the present invention.

Figure 3:
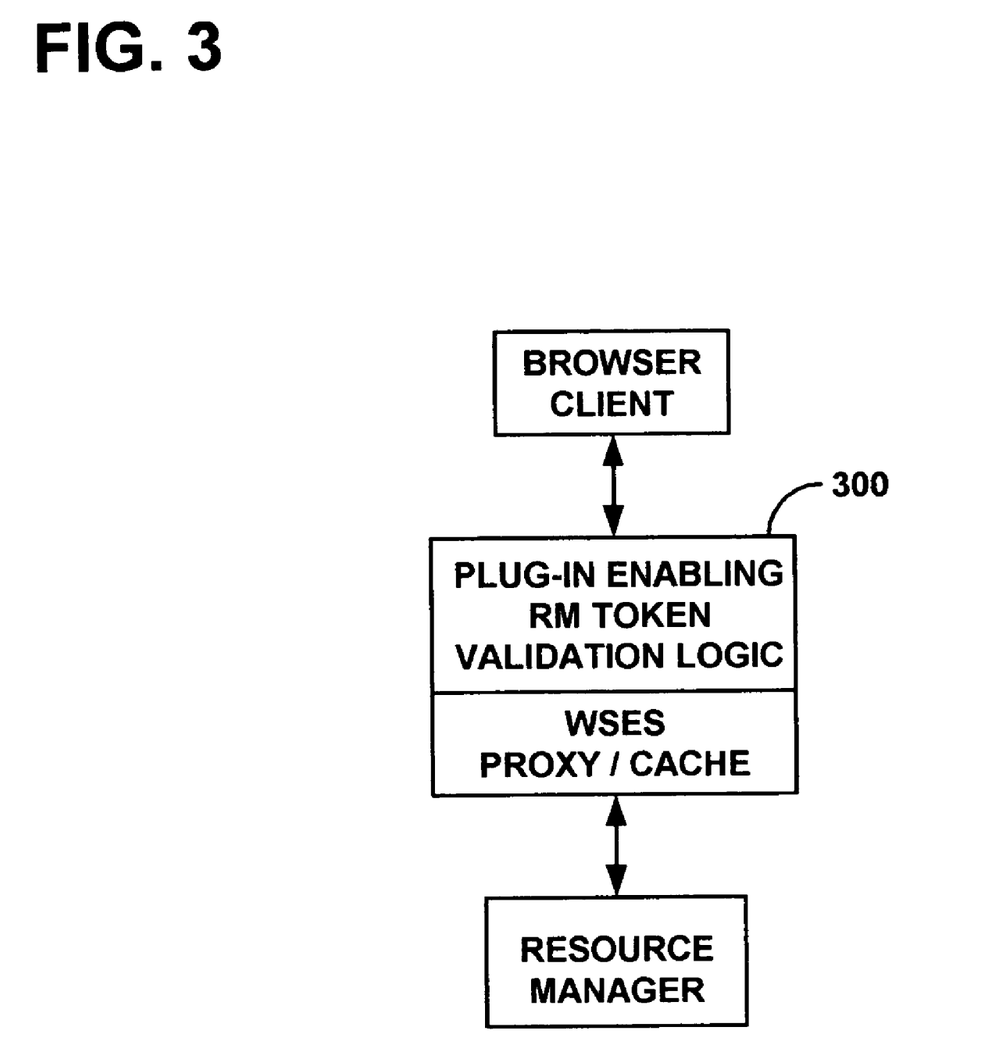
FIG. 3 is a diagram of the integration of a web caching proxy for content stored on a Resource Manager, according to an embodiment of the present invention.

Referring now to FIG. 3, the integration of a web caching proxy for content stored on a Resource Manager is shown. The proxy cache 300 sits between the user's browser and the Resource Manager. All three embodiments rely on a plug-in at the caching proxy to ensure that the Library Server access control rules are enforced at the cache proxy for any cached Resource Manager content.

In a first embodiment, the proxy cache plug-in calls back to the Resource Manager. This approach requires additional functionality at the Resource Manager servlet to respond to a request to indicate whether a URL contains a valid access token which would allow retrieval of the given object. The response from the Resource Manager is simply "yes" or "no", i.e. the token is either valid or invalid for 'retrieve' access to the object specified in the URL. The Resource Manager does not deliver the object.

The WSES cache proxy plug-in of the first embodiment intercepts requests to retrieve Resource Manager objects. If the plug-in determines that the object requested is already cached, then the plug-in generates an HTTP request which is sent to the Resource Manager. The request is composed of the information about the Resource Manager object contained in the original request being serviced by the cache proxy, but rather than a request to retrieve the object, the request is only to determine if the access token is valid. The cache proxy waits for the reply from the Resource Manager. If the Resource Manager indicates that the token is valid, the object will be served from the cache. Otherwise, an HTTP Forbidden (403) response is returned to the client.

This approach still requires a network roundtrip to the Resource Manager server for token validation even when the object is cached locally at the proxy server. If the object is large, then this overhead may be justified. Otherwise, the caching at a proxy may not improve performance. The following two approaches eliminate the need for the network communication with the Resource Manager to determine if tokens are valid.

In a second embodiment, the cache proxy plug-in validates tokens locally. If an object is cached, the plug-in extracts the access token from the URL. First, a comparison is made between the current time and the token expiration time, Tx. If the token has not expired, the MAC H is computed as described earlier. If H matches the MAC h contained within the token, the content is served from the cache. This method of integrating Content Manager and the WSES cache proxy thus enables the cache to serve Content Manager content while enforcing the Content Manager access control rules.

Figure 4:
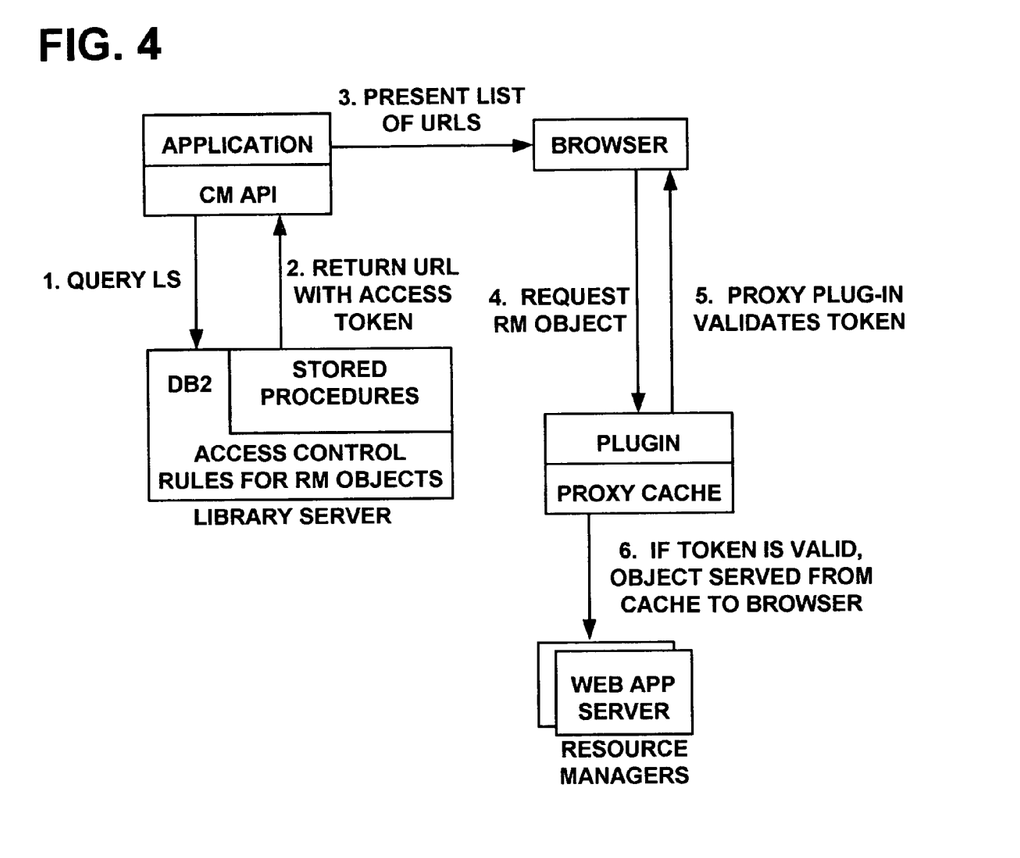
FIG. 4 is a diagram of the access control flow including caching, according to an embodiment of the present invention.

Referring now to FIG. 4, the access control flow including caching is shown. The primary difference is that after the Resource Manager object is requested in step 4, the proxy cache 300 checks first to see if the object is cached as shown in step 5. If the object is cached, then the plug-in performs the token validation locally as shown in step 6. If the object is not cached, the request flows to the Resource Manager and as the response flows back to the browser, the object will be cached at the proxy. Caching is based on Object ID and Version Number, but not on the particular access token contained within the URL, so that only one copy of the object will get cached.

The cache proxy server must know the secret key, K and the algorithm used to compute the one-way hash function. This is because token validation requires the calculation of the MAC, H as described earlier. The security of the access control token scheme is based not on the particular algorithm used to calculate the MAC, but on keeping the key, K secret. If K is compromised, the holder of K could generate access control tokens for any Content Manager object stored on the Resource Managers and thus gain access to restricted content.

The requirement that the proxy cache must know the secret key, K thus introduces potential problems in terms of distribution of the secret key to the proxy caches, as well as storage of the key at the proxy cache. The proxy must stay in sync with the Library Server, as it must obtain a new K whenever the secret key is refreshed by the Content Manager system.

The third embodiment of the present invention introduces public/private key technology to Content Manager access control tokens, and mitigates the problems of secret key storage and distribution and is believed to be the best mode of practicing the invention. This approach keeps the token validation logic at the cache proxy as illustrated in FIG. 4, but introduces public/private key technology. The Library Server and Resource Manager are updated with a new method for generation/validation of access tokens. Public key cryptography can be used to digitally sign documents [Sch]. The token generated at the Library Server contains a digital signature for the Resource Manager object. The Resource Manager can then validate that digital signature before delivering the object.

A public key cryptosystem relies on a pair of keys: a public key and a private key. In general, one key of the pair is used for encryption and the other key is used for decryption. For example assume Kpu is the public key and Kpr is the private key. Encryption of a message, T to cipher text, C can be done with the public key as:

$$C = E_{Kpu}(T),$$

where $E_{Kpu}$ represents the encryption algorithm using the public key. Decryption of the cipher text to recover the original message makes use of the private key:

$$T = D_{Kpr}(C),$$

where $D_{Kpr}$ represents the decryption algorithm using the private key.

In public key cryptography, it is also possible to encrypt using the private key and decrypt using the public key. Digital signatures employ this usage of public/private keys. A digital signature for a document can be generated by encrypting the document with the private key of the signer. A receiver of the document decrypts it using the public key of the signer. In practice, a one-way hash of the document is usually signed instead of the entire document. Another public key system for generating digital signatures is the DSA standard [DSA]. This algorithm generates digital signatures, but cannot be used for encryption.

Public key cryptography was introduced to Content Manager to generate/validate Content Manager access control tokens as follows: The Library Server uses a private key to generate a digital signature for a Resource Manager object. This digital signature replaces the MAC (described earlier) in the access token. The Resource Manager makes use of the corresponding public key to validate the digital signature contained inside the token. A cache proxy can also use the public key to validate the token for cached Resource Manager objects.

Two digital signature methods were investigated. The first relies on RSA [RSA] encryption of a one-way hash of information uniquely identifying the Resource Manager object. The second employs the digital signature standard [DSA]. The access control flow of token generation/validation still follows FIG. 2.

In the RSA method, a one-way hash value is first computed, then that hash value is encrypted. Overall this procedure is similar to the procedure used to generate the MAC, m' as outlined above. The hash value becomes the message to be encrypted by the Library Server using the private key. So the RSA digital signature, $DS_{RSA}$ is computed from $$DS_{RSA} = E_{Kpr}(h')$$

where h' is the one-way hash value found as follows:

$$h' = hash(Tx, ObjID, VerNo, AccType, flags).$$

The one-way hash could be computed from a variety of hash functions including for example MD5 [MD5], Secure Hash Algorithm [SHA1], etc. Since the object does not reside on the Library Server, it is not practical to dynamically generate a one-way hash value based on the actual content of the object. The digital signature becomes part of the access token. The hash is a function of token expiration time, the object ID, the object version number, the access type allowed, and various flags identifying the object and the token.

The DSA standard specifies the use of the Secure Hash Algorithm, SHA in a signing algorithm, DSAsign, which uses a private key, Kpr to generate a DSA digital signature, $DS_{DSA}$:

$$DS_{DSA} = DSAsign(Kpr, SHA(Tx, OjbID, VerNo, AccType, flags))$$

Again, the digital signature, $DS_{DSA}$ is contained within the access token along with Tx, AccType and flags.

Token validation is done by the Resource Manager using the public key as follows: If RSA encryption was used to generate the token, the Resource Manager first checks the token expiration time, Tx so make sure that the token has not expired. Next it compares the access type requested in the URL with the allowed access contained within the token. If the requested access is allowed, the Resource Manager computes the one-way hash value H', $$H' = hash(Tx, ObjiD, VerNo, AccType, flags)$$

Next the Resource Manager decrypts the RSA digital signature using the public key, to obtain h', the hash value computed at the Library Server:

$$h' = D_{Kpu}(DS_{RSA})$$

If H' matches h', then the signature has been verified and the token is valid.

If the token was generated by the Library Server using DSA, then the Resource Manager proceeds as follows to validate the token. First Tx and the access type are validated as above. Next the DSA verification algorithm is used with the public key to verify the signature, $DS_{DSA}$ contained within the token:

$$V = DSAverify(DS_{DSA}, Kpu, SHA(Tx, OjbID, VerNo, AccType, flags))$$

If V is found to be true, then the token is valid and the Resource Manager will allow the requested access (create, retrieve, update, delete, or stream) on the object.

While there currently is a process in place by which the secret key(s) stored on the Library Server get distributed to the Resource Managers, the requirements on this communication can be lessened if only public keys rather than secret keys are being distributed. Another advantage of the use of public key technology in the generation of access tokens is the incorporation of third party Resource Managers within Content Manager. If a vendor has as server optimized to store and deliver a specialized type of content, Content Manager would be able to encompass such vendors and keep in place the existing content access control method. The third party vendor would only need to know the method used to generate the digital signatures within the access tokens, and the public key. However, such a vendor system would need to know the secret key, which is a greater security risk.

If the access tokens are generated using public key technology as outlined above, the cache proxy needs only the public key to validate tokens. The access control flow still follows that shown in FIG. 4.

The token validation done by the cache proxy plug-in follows exactly the method outlined in the previous section for validation of digital signature tokens by the Resource Manager. The problem of distributing secret keys has been mitigated in this approach.

Objects managed by a content management system often have strict access control rules, thus delivery of such content may not be able to take advantage of the benefits of web caching. An integration of Content Manager with the Cache Proxy component of WebSphere Edge Server is an exemplary solution to this problem. The plug-in architecture of the WSES Cache Proxy ensures that users requesting content stored in the cache are authorized by the content management system to have access to that content. Content Manager uses an access token method to communicate to a Resource Manager that a requester has obtained permission from the Library Server to access a Resource Manager object.

To summarize, three different approaches are described. The first extends the Resource Manager to respond to requests from the cache proxy plug-in to determine if an access token is valid. The other two approaches require plug-ins to validate access tokens locally at the cache proxy; one approach uses secret symmetric key encryption, and the other uses public/private key digital signatures. The performance of the two approaches is similar since neither requires network contact with the Resource Manager for token validation. However, use of public/private key technology in generating the access tokens eliminates the problem of secret key distribution.

A general purpose computer is programmed according to the inventive steps herein. The invention can also be embodied as an article of manufacture—a machine component—that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the particular SYSTEM AND METHOD FOR REGULATING ACCESS TO OBJECTS IN A CONTENT REPOSITORY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

REFERENCES

[BBHMNS02] S. Bhattacharya, K. Brannon, H. Hsiao, C. Mohan, I. Narang, M. Subramanian, Coordinating Backup/Recovery and Data Consistency Between Database and File Systems, Proc. ACM SIGMOD Conf., Madison, Wis., June 2002.

[CDNSW96] A. Chankhunthod, P. B. Danzig, C. Neerdaels, M. F. Schwartz, and K. J. Worrell. A Hierarchical Internet Object Cache. 1996 USENIX Technical Conf. San Diego, Calif., January 1996.

[Danzig98] NetCache Architecture and Deployment, Proc Third International WWW Caching Workshop, Manchester, England, June 1998.

[Davison] Proxy Caches, http://www.webcaching.com/proxy-caches.html

[Doc] Documentum Content Management System, http://www.documentum.com

[DSA] Digital Signature Standard, NIST FIPS Pub 186, (1994), http://www.itl.nist.gov/fipspubs/fip186.htm

[FileN] FileNet Content Manager, http://www.filenet.com

[Her03] M. Herbach, Manage your digital content effectively, IBM DB2 Whitepaper G325-2143-00, March 2003

[ITS] Inktomi Traffic Server, http://www.inktomi.com/products/cns/

[LNB-L] CERN httpd, http://www.w3.org/Daemon/Status.html

[Jigsaw] Jigsaw, W3C Java Web Server, http://www.w3.org/Jigsaw

[RFC1738] RFC 1738, Uniform Resource Locators, http://www.w3.org/Addressing/rfc1738.txt

[RSA] R. L. Rivest, A. Shamir and L. M. Adelman, A Method for Obtaining Digital Signatures and Public-Key Cryptosystems, Comm of the ACM, V21, p 120-126, (1978).

[Sch] B. Schneier, Applied Cryptography 2nd Ed., John Wiley and Sons, New York, 1996

[SWPC] Squid Web Proxy Cache, http://www.squid-cache.org

[WSES] IBM WebSphere Edge Server, http://www.ibm.com/software/webservers/edgeserver

[WSESPG] WebSphere Edge Server Programming Guide V2.0, GC09-4568-02, http://www.ibm.com/software/webservers/edgeserver/library.html

[WSESV2] IBM WebSphere Edge Server New Features and Functions in version 2, SG24-6511-00, http://www.ibm.com/redbooks

We claim:

1. A computer-implemented method for regulating access to content within a content management computing system, the content management system comprising a library server computer, a plurality of resource manager server computers operating independently from the library server computer, and a proxy cache server, the method comprising:

storing content provided to the content management system on a resource manager server within the plurality of resource manager server computers;

storing content access control rules and metadata on the library server for the content provided to the content management system;

caching content provided to clients from the content management system using the proxy cache server, the proxy cache server operating independently from the library server and the resource manager server;

generating an access control token used for controlling access to one or more content items and metadata of the one or more content items within the content management system, wherein the access control token is generated exclusively by the library server using the content access control rules stored for the one or more content items;

providing the server-generated access control token to one or more authorized clients to enable the one or more authorized clients to access the one or more content items and the metadata of the one or more content items;

receiving a request for requested content from a client, the request including a client-provided access control token;

validating, using either of the resource manager server or the proxy cache, the client-provided access control token against the server-generated access control token; and delivering the requested one or more content items directly from the proxy cache server to the client upon successful validation of the client-provided access control token.

2. The method of claim 1, wherein if the proxy cache server contains the one or more content items then the proxy cache server asks the resource manager server to perform the validation of the client-provided access control token against the system-generated access control token.

3. The method of claim 1, wherein if said proxy cache contains said requested content then said proxy cache performs said validation locally, after synchronizing with said library server.

4. The method of claim 1, wherein the server-generated access control token includes one or more digital signatures generated using a private key owned by the library server and validated with a public key at either of the resource manager server or the proxy server.

5. The method of claim 1, wherein if the proxy cache server does not contain a copy of each item of the one or more content items then the resource manager server delivers uncontained content items to the proxy cache server, which then also stores the uncontained content items.

6. The method of claim 5, wherein the proxy cache server stores only one copy of the one or more content items by using an object ID and a version number.

7. The method of claim 1, wherein the proxy cache server is a first resource manager server that cooperates with a second resource manager server.

8. The method of claim 1, wherein the client-provided access control token access control token includes an expiration time and validating the client-provided access control token includes determining if the client-provided access control token has expired.

9. The method of claim 1, wherein the one or more content items includes at least one of: a text file, an image file, a binary file, and a video file.

10. The method of claim 1, wherein the server-generated access control token includes a message authentication code having a one-way hash and a secret key.

11. A content management system, comprising:

a library server that stores content access control rules and metadata for the content provided to the content management system a plurality of resource manager servers that store content provided to the content management system; and a proxy cache server that caches content provided to clients from the content management system, the proxy cache server operating independently from the library server and the resource manager server;

wherein access to content within the content management system is regulated by the content management system performing the steps of:

generating an access control token used for controlling access to one or more content items and metadata of the one or more content items within the content management system, wherein the access control token is generated exclusively by the library server using the content access control rules stored for the one or more content items;

providing the server-generated access control token to one or more authorized clients to enable the one or more authorized clients to access the one or more content items and the metadata of the one or more content items;

receiving a request for requested content from a client, the request including a client-provided access control token;

validating, using either of the resource manager server or the proxy cache, the client-provided access control token against the server-generated access control token; and delivering the requested one or more content items directly from the proxy cache server to the client upon successful validation of the client-provided access control token.

12. The system of claim 11, wherein if the proxy cache server contains the one or more content items then the proxy cache server asks the resource manager server to perform the validation of the client-provided access control token against the system-generated access control token.

13. The system of claim 11, wherein if said proxy cache contains said requested content then said proxy cache performs said validation locally, after synchronizing with said library server.

14. The system of claim 11, wherein the server-generated access control token includes one or more digital signatures generated using a private key owned by the library server and validated with a public key at either of the resource manager server or the proxy server.

15. The system of claim 11, wherein if the proxy cache server does not contain a copy of each item of the one or more content items then said the resource manager server delivers uncontained content items to said the proxy cache server, which then also stores the uncontained content items.

16. The system of claim 15, wherein the proxy cache server stores only one copy of the one or more content items by using an object ID and a version number.

17. The system of claim 11, wherein the proxy cache server is a first resource manager server that cooperates with a second resource manager server.

18. The system of claim 11, wherein the client-provided access control token access control token includes an expiration time and validating the client-provided access control token includes determining if the client-provided access control token has expired.

19. The system of claim 11, wherein the one or more content items includes at least one of: a text file, an image file, a binary file, and a video file.

20. The system of claim 11, wherein the server-generated access control token includes a message authentication code having a one-way hash and a secret key.

21. A content management system, comprising:

means for storing content access control rules and metadata for the content provided to the content management system;

means for storing content provided to the content management system; and means for caching content provided to clients from the content management system, the means for caching content operating independently from the means for storing content access control rules and metadata and the means for storing content;

wherein access to content within the content management system is regulated by the content management system performing the steps of:

generating an access control token used for controlling access to one or more content items and metadata of the one or more content items within the content management system, wherein the access control token is generated exclusively by the means for storing content access control rules and metadata using the content access control rules stored for the one or more content items;

providing the server-generated access control token to one or more authorized clients to enable the one or more authorized clients to access the one or more content items and the metadata of the one or more content items;

receiving a request for requested content from a client, the request including a client-provided access control token;

validating, using either of the means for storing content or the means for caching content, the client-provided access control token against the server-generated access control token; and delivering the requested one or more content items from the means for caching content to the client upon successful validation of the client-provided access control token.

22. A computer program product comprising a machine-readable medium having computer-executable program instructions thereon for content management, including:

a first code means for storing content provided to a content management system on a resource manager server within a plurality of resource manager servers;

a second code means for storing content access control rules and metadata on a library server for the content provided to the content management system;

a third code means for caching content provided to clients from the content management system using a proxy cache server, the proxy cache server operating independently from the library server and the resource manager server;

a fourth code means for generating an access control token used for controlling access to one or more content items and metadata of the one or more content items within the content management system, wherein the access control token is generated exclusively by the library server using the content access control rules stored for the one or more content items;

a fifth code means for providing the server-generated access control token to one or more authorized clients to enable the one or more authorized clients to access the one or more content items and the metadata of the one or more content items;

a sixth code means for a request for requested content from a client, the request including a client-provided access control token;

a seventh code means for validating, using either of the resource manager server or the proxy cache, the client-provided access control token against the server-generated access control token; and an eighth code means for delivering the requested one or more content items directly from the proxy cache server to the client upon successful validation of the client-provided access control token.

23. A computer-implemented business service method enabling enhanced content management and distribution in electronic commerce, comprising:

storing content provided to a content management system on a resource manager server within a plurality of resource manager server computers;

storing content access control rules and metadata on a library server for the content provided to the content management system;

caching content provided to clients from the content management system using a proxy cache server, the proxy cache server operating independently from the library server and the resource manager server;

generating an access control token used for controlling access to one or more content items and metadata of the one or more content items within the content management system, wherein the access control token is generated exclusively by the library server using the content access control rules stored for the one or more content items;

providing the server-generated access control token to one or more authorized clients to enable the one or more authorized clients to access the one or more content items and the metadata of the one or more content items;

receiving a request for requested content from a client, the request including a client-provided access control token;

validating, using either of the resource manager server or the proxy cache, the client-provided access control token against the server-generated access control token; and delivering the requested one or more content items directly from the proxy cache server to the client upon successful validation of the client-provided access control token.

* * * * *